United States Patent [19]

Levie

[11] 4,431,893
[45] Feb. 14, 1984

[54] FRONT PROGRAMMABLE TIMER FOR A MICROWAVE OVEN

[75] Inventor: Stephen A. Levie, Burnsville, Minn.

[73] Assignee: Litton Systems, Inc., Beverly Hills, Calif.

[21] Appl. No.: 324,146

[22] Filed: Nov. 23, 1981

[51] Int. Cl.³ .............................................. H05B 9/06
[52] U.S. Cl. ..................... 219/10.55 B; 219/10.55 M; 340/309.4
[58] Field of Search ................. 219/10.55 B, 10.55 M; 340/309.1–309.4, 365 C; 368/107–113, 10

[56] References Cited

U.S. PATENT DOCUMENTS

| | | | |
|---|---|---|---|
| 3,569,656 | 3/1971 | White | 219/10.55 B |
| 3,735,081 | 5/1973 | Foerstner | 219/10.55 B |
| 3,846,607 | 11/1974 | Bucksbaum | 219/10.55 B |
| 4,131,786 | 12/1978 | Cooper | 219/487 |
| 4,158,432 | 6/1979 | van Bavel | 235/304.1 |
| 4,158,759 | 6/1979 | Mason | 219/10.55 B |
| 4,266,118 | 5/1981 | Takase et al. | 219/492 |
| 4,295,027 | 10/1981 | Zushi et al. | 219/10.55 B |

*Primary Examiner*—Roy N. Envall, Jr.
*Assistant Examiner*—M. M. Lateef
*Attorney, Agent, or Firm*—John M. Haurykiewicz; Robert E. Lowe

[57] ABSTRACT

A front programmable timer provides for the programming, selecting, and operating according to desired operating times in a set of input switches for a microwave oven controller. Retention of the times programmed is provided for in the event of loss of power. A TEST mode provides for exercising a visible display, an audible indicator and a microwave command output signal from the controller. A tamper-proof switch assembly is provided to select OPERATE or PROGRAM modes.

11 Claims, 6 Drawing Figures

| DOOR POSITION | DOOR INTERLOCK SWITCHES | | | |
|---|---|---|---|---|
| | I A-B | I A-C | II | III |
| CLOSED | CLOSED | OPEN | CLOSED | OPEN |
| AJAR | OPEN | CLOSED | OPEN | OPEN |
| OPENING/CLOSING | OPEN | CLOSED | OPEN | CLOSED |
| OPEN | OPEN | CLOSED | OPEN | OPEN |

FRONT PROGRAMMABLE TIMER FOR A MICROWAVE OVEN

INTRODUCTION

This invention relates to apparatus and method for programming and operating a timer for commercial microwave oven controllers and specifically to a front programmable timer in which the same input switches used to operate the oven are also utilized to program the timer.

BACKGROUND OF THE INVENTION

A typical installation for a commercial microwave oven is a fast-food franchise outlet where it is common to require exact cooking times for each food offered to assure uniformity of results. At the same time it is common for such an outlet to have employees such as high school students who are not skilled in cooking. These needs have been met by commercial microwave ovens having a set of input switches or buttons which enable an unskilled oven operator to select from among a predetermined set of cooking times. In such ovens, ease and speed of selection of the proper heating or cooking cycle has been paramount. In contrast to a consumer oven operation where a number of switch actuations are required to initiate a cooking cycle, a commercial oven generally requires only one switch actuation for operation according to a particular cycle. However such prior commercial ovens lacked "front programmability". The predetermined cooking times were fixed in the oven during manufacture, and in order to change the time for a particular cycle in such ovens it was necessary to at least partially disassemble the oven and make adjustments to or replacements of parts within the oven controller. Such procedure requires the presence of trained service personnel and is thus inconvenient and costly to a microwave oven owner. However the need to change the cooking times continued to grow. Many fast-food chains revise their menus from time to time, substituting new items for old to improve their offerings. Because changing even a single cooking time in a prior art commercial oven was difficult, it did not meet the needs of these oven owners.

BRIEF DESCRIPTION OF THE INVENTION

The present invention overcomes the above described shortcomings of prior commercial microwave oven timers without losing ease and speed of operation by providing a front programmable timer for commercial microwave oven controllers. By "front programmability" is meant providing the oven owner but not the operator with the ability of changing the time for a particular cooking cycle from the front panel of the oven without disassembly or replacement of parts within the oven controller. This is accomplished by the timer of the present invention which comprises a tamper-proof switch having first and second positions for selecting either a PROGRAM mode or an OPERATE mode and a plurality of input switches operable in the PROGRAM mode to input a plurality of desired operating times such that each time inputted is retained in association with a respective one of the input switches. The same input switches are operable in the OPERATE mode to operate the microwave oven controller according to one of the desired operating times. While in the operate mode, actuation of one input switch will cause articles contained within the microwave oven cavity to be heated by microwaves for the associated desired operating time.

According to another aspect of the invention, a display is utilized to present the desired operating time when an input switch is actuated while in the PROGRAM mode and to present the time remaining of a particular desired operating time when an input switch is actuated while in the OPERATE mode.

According to another aspect of the invention, storage means are provided for storing the desired operating times in the event of loss of electrical power to the controller.

According to still another aspect of the invention, a set of preset times, each in association with a respective one of the input switches is provided so that each of the input switches has a particular preset time associated therewith upon initial application of electrical power to the controller. Each of these preset times is available for selection by an oven operator while the oven is in the OPERATE mode and is able to easily be changed by the oven owner when the PROGRAM mode is selected by means of the tamper-proof switch.

According to still another aspect of the invention, a TEST mode is provided to exercise the display, audible output, and controller output signal commanding microwave activation.

Various other features and advantages of this invention will be apparent upon reading the following specification, which along with the patent drawings, describes and discloses a preferred embodiment of the invention in detail.

DETAILED DESCRIPTION

Figure 1:
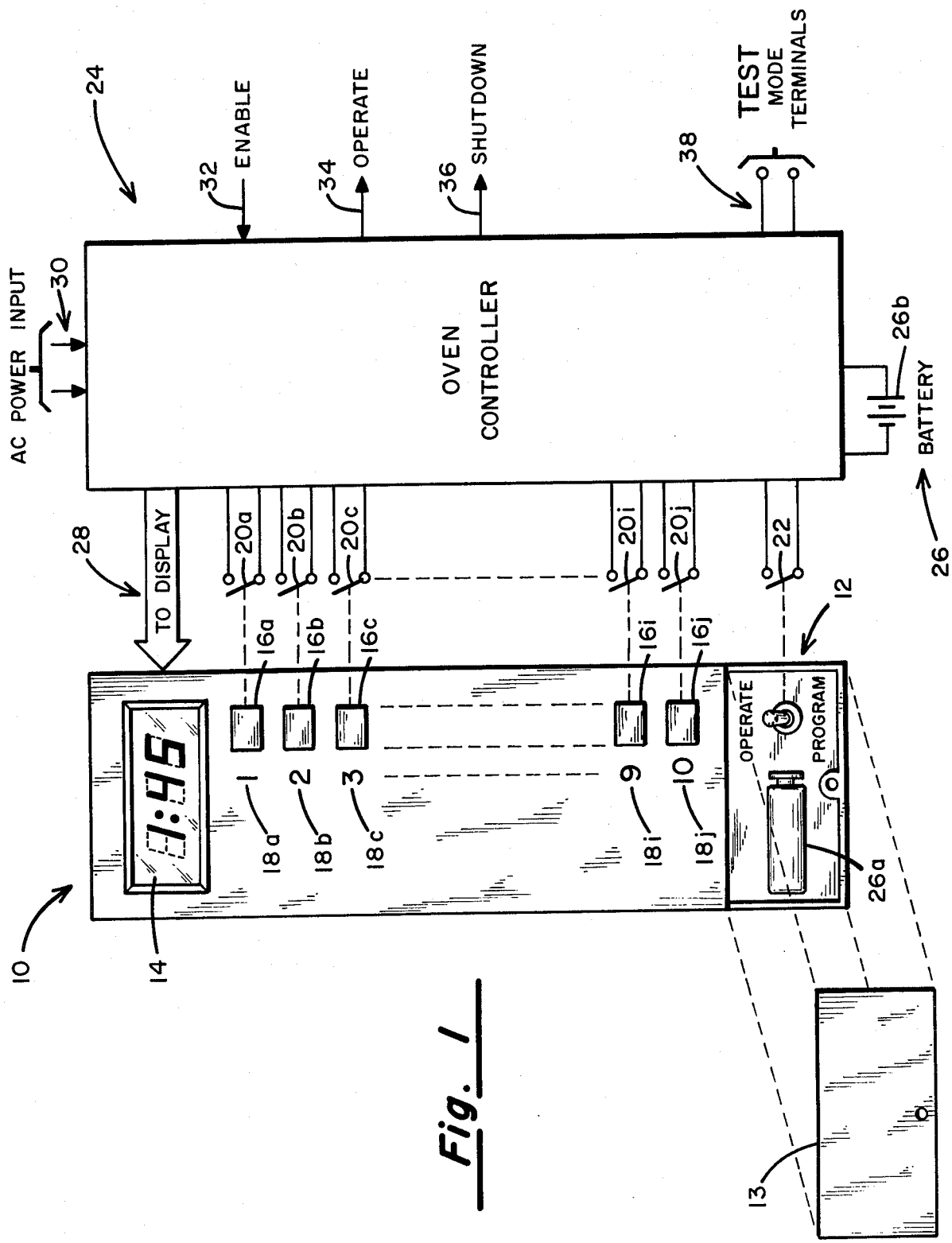
FIG. 1 includes both a pictorial representation of the front panel and a block diagram of the oven controller showing various features of the commercial microwave oven environment of this invention.

Referring to FIG. 1, a pictorial view of a front panel of the commercial microwave oven environment of the present invention is shown generally at 10. A lower portion 12 of the front panel 10 is shown with an access cover or panel 13 removed. The preferred embodiment includes a display 14 and a set of input switch buttons 16a–j identified by labels 18a–j and operable to actuate input switches 20a–j.

The lower portion 12 of front panel 10 preferably includes a two-position switch 22 to enable selection of an OPERATE or PROGRAM mode for an oven controller 24. Switch 22 is made tamper-proof by concealing it behind panel 13 used to cover the lower portion 12 of the front panel during normal operation of the oven. An owner-replaceable battery 26 is also contained in the lower portion 12 of front panel 10. Battery 26 is shown pictorially at 26a and schematically at 26b. In the preferred embodiment, battery 26 is a conventional 9 volt battery commonly used and available for transistor radios and the like. Battery 26 is used by controller 24 to prevent loss of desired operating times stored in a storage or memory portion of controller 24 in the event of a loss of external electrical power to controller 24 at an AC power input 30.

Also shown in FIG. 1 are a set of display drive line connections shown generally at 28, an ENABLE input signal 32, an OPERATE output signal 34, a SHUTDOWN output signal 36 and a pair of TEST mode terminals 38. Preferably the pair of TEST mode terminals 38 are accessible only to service personnel after partial disassembly of the microwave oven.

Figures 2A, 2B:
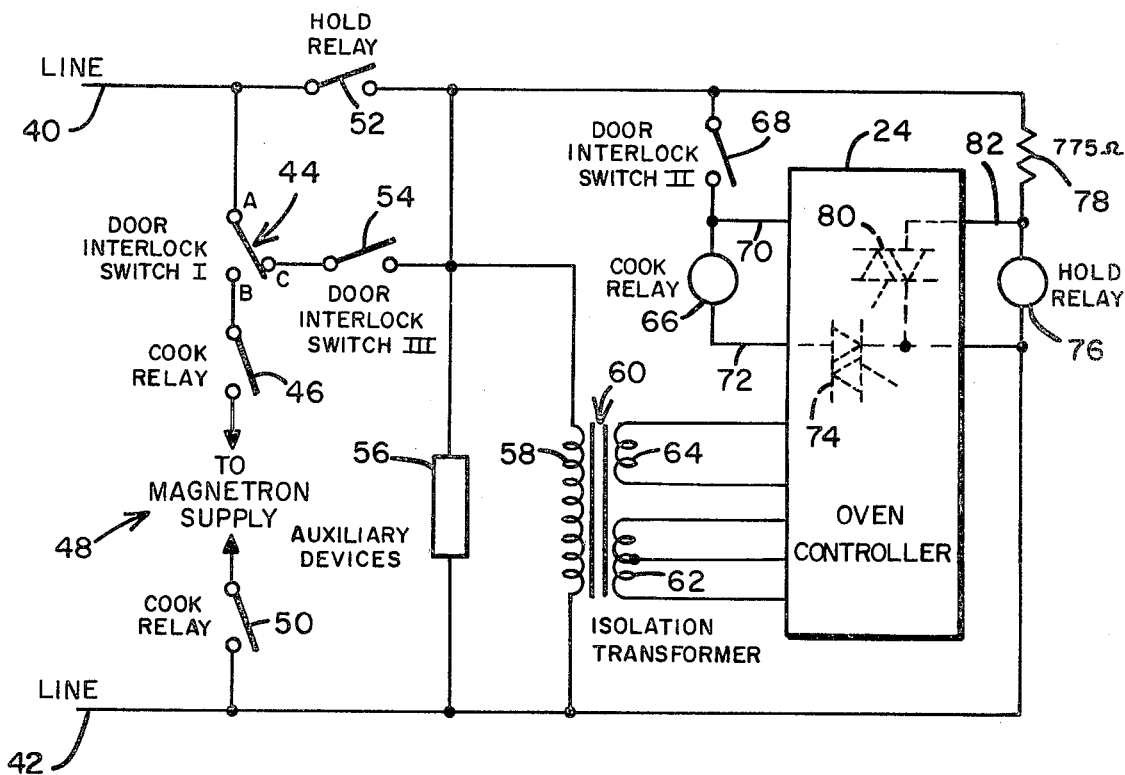
FIG. 2A is a schematic diagram of the interlock circuit associated with the oven controller of the present invention.
FIG. 2B is a table showing the contact conditions for the door interlock switches of the commercial microwave oven environment of the present invention.

Referring now to FIG. 2A, in the preferred embodiment, AC power input 30 is provided to the circuit through lines 40 and 42. Power is supplied from line 40 through a two-position transfer contact 44 of door interlock switch I and a cook relay contact 46 to a magnetron supply indicated generally at 48. The power return from the magnetron supply 48 is through another cook relay contact 50 to Power line 42. Power to the remaining portion of the circuit is provided through parallel paths of a hold relay contact 52 from line 40 directly and a door interlock switch III contact 54 through another path of contact 44. Power is thereby carried to a set of auxiliary devices shown generally at 56 and a primary winding 58 of an isolation transformer 60. A first secondary winding 62 of isolation transformer 60 preferably provides a 22 volt center-tapped supply to controller 24. A second secondary winding 64 of transformer 60 preferably provides filament power for display 14.

As will be described in more detail later, power is made available to a cook relay coil 66 through a door interlock switch II contact 68. The presence of power at lead 70 due to closure of contact 68 corresponds to the ENABLE signal 32 of FIG. 1. The power path for cook relay 66 is completed through a lead 72 and a first triac 74 connecting cook relay 66 to return line 42. In the preferred embodiment cook relay 66 is comprised of a 120 volt AC type relay. Completion of a circuit path at lead 72 by triggering triac 74 corresponds to the OPERATE signal 34 of FIG. 1.

Power is supplied to a hold relay coil 76 through a nominal 775 ohm resistor 78. Hold relay 76 is shunted by a second triac 80. Triacs 74 and 80 are shown by dashed lines to indicate that their respective circuit paths are within controller 24. In the preferred embodiment hold relay 76 is comprised of a 24 volt AC type relay. Completion of a circuit path at lead 82 around relay 76 by triggering triac 80 corresponds to the SHUTDOWN signal 36 of FIG. 1.

The operation of the circuit of FIG. 2A may be best understood by reference to FIGS. 1, 2A and 2B. FIG. 2B depicts the condition of door interlock switches for static and dynamic operation of the door of the microwave oven of this invention. Reading FIG. 2B from top to bottom corresponds to opening the door from an initially closed condition. Conversely reading FIG. 2B from bottom to top corresponds to closing the oven door from an initially open condition. When the oven door is closed contacts A-B of door interlock switch I and the contact of door interlock switch II are closed. Concurrently the contacts A-C of door interlock switch I and the contacts of switch III are open. As the oven door is opened the first switch event to occur is the opening of contacts A-B of switch I and the contacts of switch II and the closing of contact A-C of door interlock switch I. As the door is opened further, a momentary closure of door interlock switch III occurs. Finally as the door is further opened and while it remains open, contact A-C of door interlock switch I remains closed and all other door interlock switch contacts remain open.

Closing the oven door results in the above sequence in reverse with the first event being a momentary closure of door interlock switch III, preferably caused by cam and cam follower engagement between a projection on the oven door and switch within a mating receptacle on the face of the oven.

Referring now more particularly to FIG. 2A, power is present initially at lines 40 and 42. Assuming the oven door position is initially closed, contacts A-B of door interlock switch I 44 are closed and contacts A-C are open. Opening (or closing) the oven door will result in a momentary condition wherein contacts A-C of door interlock switch I and contact 54 of door interlock switch III are simultaneously closed. This results in application of power to auxiliary devices 56, isolation transformer 58, and hold relay 76. Hold relay 76 becomes energized closing contact 52 which thereafter maintains relay 76 energized. Fully closing the oven door causes contact 68 to close presenting ENABLE signal 32 at lead 70. Actuation of one of the input switches 20a-j results in oven controller 24 triggering triac 74 causing OPERATE signal 34 at lead 72 to energize cook relay 66 resulting in the closure of cook relay contacts 46 and 50. Since contact A-B of door interlock switch I 44 is closed, power is supplied to the magnetron power supply at 48, energizing the magnetron. Upon completion of cooking time associated with the switch selected from among input switches 20a-j, oven controller 24 removes the trigger signal from triac 74 resulting in a loss of the OPERATE signal 34, opening contacts 46 and 50 deenergizing the magnetron. At the same time oven controller 24 actuates an audible indicator (not shown) to inform the user that the cooking cycle is completed. After a further predetermined time (nominally 60 seconds) oven controller 24 momentarily triggers triac 80 causing SHUTDOWN signal 36 at lead 82 to remove power from hold relay 76. When triac 80 is triggered, hold relay 76 is de-energized, opening hold relay contact 52 which removes power from auxiliary devices 56 and isolation transformer 58, thus shutting down oven controller 24.

Although triacs 74 and 80 are shown in FIG. 2A, it is to be understood that their functions may be performed by equivalent switch means, as for example, conventional relays.

SYSTEM OVERVIEW

Referring now to FIGS. 1, 3, 4, and 5 a systems description of the oven controller 24 is as follows. There are three modes of performance for this oven: OPERATE, PROGRAM and TEST. Normally the oven is left in the OPERATE mode when it is available to any person approaching it to heat foods by microwaves. Most often, such a person is someone other than the oven owner and is unaware of the PROGRAM and TEST modes since switch 22 is normally concealed behind panel 13. As will be described in more detail later, such a person or operator desiring to operate the oven will select an operating time by reading the input button labels. In addition to the numeric labels 18a-j, input buttons 16a-j may have individual food-type labels (not shown) associated therewith. For example, button 16b may have an additional label "sandwich" and button 16i may have "soup". The oven operator needs only to push a single button to select an operating time and cause the oven to heat the food for that time. As soon as an input button is pushed, display 14 will present the operating time selected and begin to count down. It should be understood that the time selected is a time that was previously stored in association with that input button either as a preset time or a time set by the oven owner during a previous PROGRAM mode session.

OPERATE Mode

Figure 3:
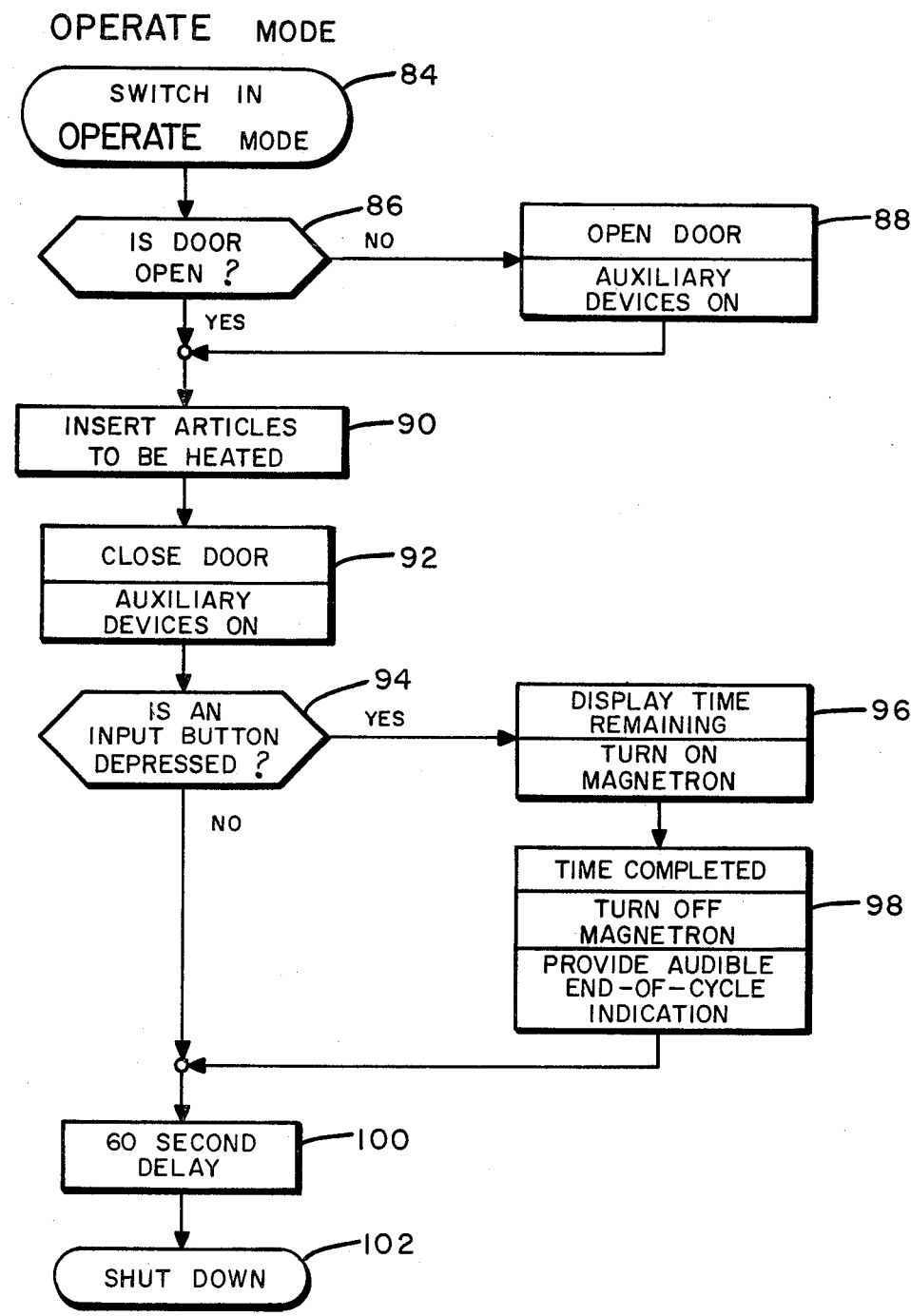
FIG. 3 is a flowchart for the OPERATE mode of the present invention.

Referring most particularly to FIG. 3, a first step 84 in the OPERATE mode is to determine that switch 22 is in the OPERATE mode setting. Next the position of the oven door is determined 86. If closed, the door is opened and auxiliary devices turned on 88. Once the door is opened, articles to be heated are inserted 90. The door is then closed and auxiliary devices turned on (if they were not on already) 92. When an input button is depressed 94 the display initially presents the time selected and thereafter presents the time remaining and the magnetron is turned on during that time 96. Once the time is completed the magnetron is turned off and an audible end-of-cycle indication is provided 98. Upon completion of the cooking cycle selected or if no cycle has been selected (no input button depressed) a 60 second delay occurs 100. The last step in the OPERATE mode is a shutdown 102 of the auxiliary devices 56 and oven controller 24.

PROGRAM Mode

It is to be understood that the PROGRAM mode is not intended to be available to oven operators (persons seeking to heat foods in the oven). The PROGRAM mode is intended to be accessible only to the oven owner who will remove access cover 13 temporarily to reach switch 22 during the PROGRAM mode. Of course the oven owner may delegate responsibility to an employee or programmer without making the PROGRAM mode generally available to oven operators.

Figure 4:
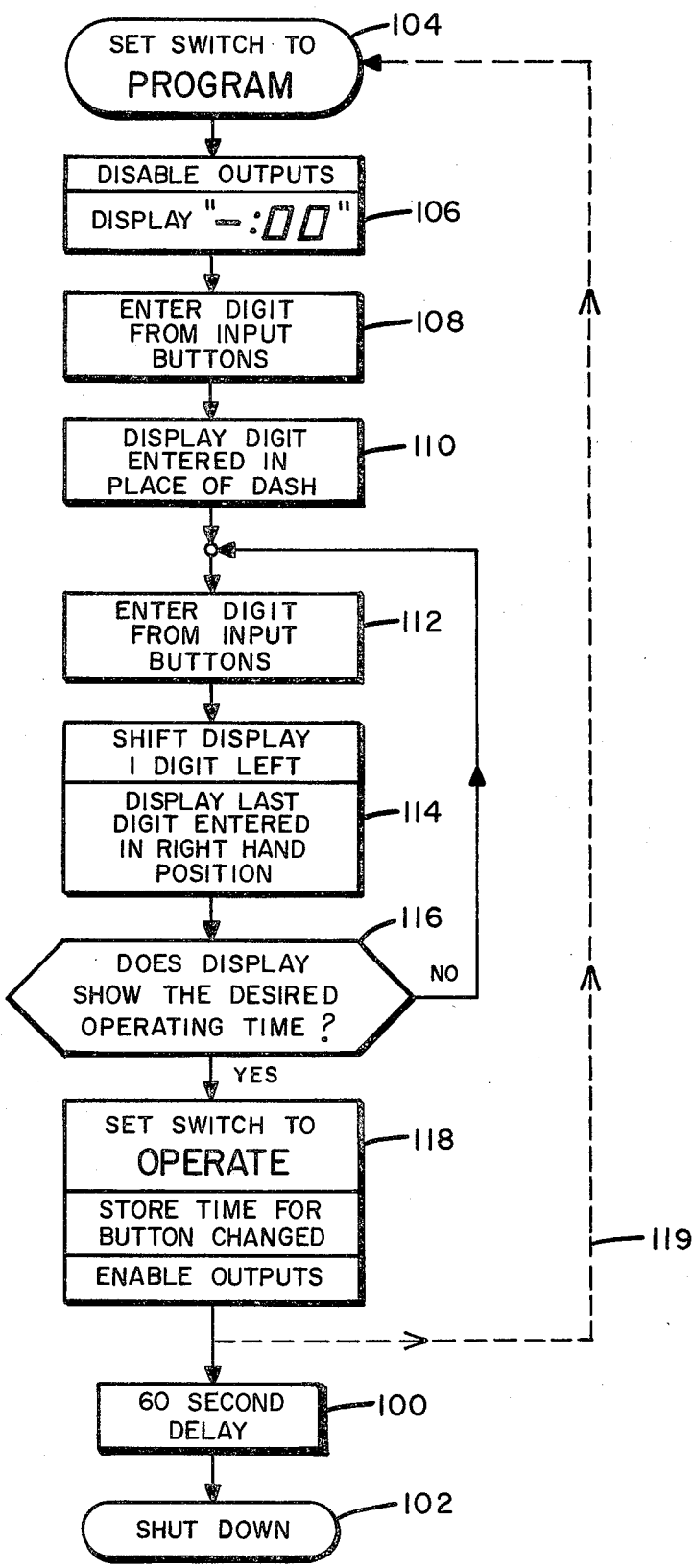
FIG. 4 is a flowchart of the PROGRAM mode for the present invention.

Referring now to FIGS. 1 and 4 the PROGRAM mode of this invention is as follows. The first step 104 of the PROGRAM mode is to put the oven controller 24 in the PROGRAM mode by setting switch 22 to the PROGRAM mode position. This disables outputs 34 and 36 and causes display 14 to show "-:00" 106. Next a digit is entered 108 using the input buttons 16a-j. The digit to be entered preferably is comprised of one of the decimal digits 18a-j corresponding to input buttons 16a-j. (Label 18j is shown as a decimal "10" however the decimal digit 0 is entered by means of input button 16j.) At this time the display will present 110 the digit entered in place of the dash in the left hand position of the display. Entering 112 the next digit from input buttons 16a-j will cause the number in the display to shift one digit to the left with the last digit entered appearing 114 in the right-hand position. At this time a decision must be made 116 whether the display shows the desired operating time. If not, steps 112 and 114 of entering and displaying additional digits are performed. Once the display shows the desired operating time, switch 22 is set 118 to the OPERATE position, storing the desired operating time in association with the button first depressed (from step 108). Setting switch 22 to the OPERATE position also enables outputs 34 and 36. If additional buttons are desired to be programmed the preceding steps are repeated 119. After buttons are satisfactorily programmed, 60 second delay occurs 100 followed by shutdown 102 of auxiliary devices 56 and oven controller 24. The times programmed and retained in storage in controller 24 during the PROGRAM mode are thereafter available for selection by actuation of a single input switch (while the oven is in the OPERATE mode). The programmed times are protected against loss in the event of loss of external power since the memory storage portion of controller 24 is then powered by battery 26.

The preferred embodiment of this invention further includes a set of 10 preset times placed within the memory portion of controller 24 upon initial application of power at AC power input 30. One example of such a set of preset times is as shown in Table I. Inclusion of such a set of preset times permits operation of the microwave oven without the necessity of first programming times for respective input switches. In an embodiment having such preset times, an oven owner may readily change any or all of such preset times by entering the PROGRAM mode and executing the steps of FIG. 4.

TABLE I

| INPUT BUTTON | PRESET TIME (min:sec) |
| --- | --- |
| 1 | :05 |
| 2 | :10 |
| 3 | :20 |
| 4 | :30 |
| 5 | :40 |
| 6 | :50 |
| 7 | 1:00 |
| 8 | 1:15 |
| 9 | 1:30 |
| 10 | 1:45 |

Upon completion of the PROGRAM mode, the oven owner will replace panel 13 to prevent further access to switch 22.

TEST Mode

Figure 5:
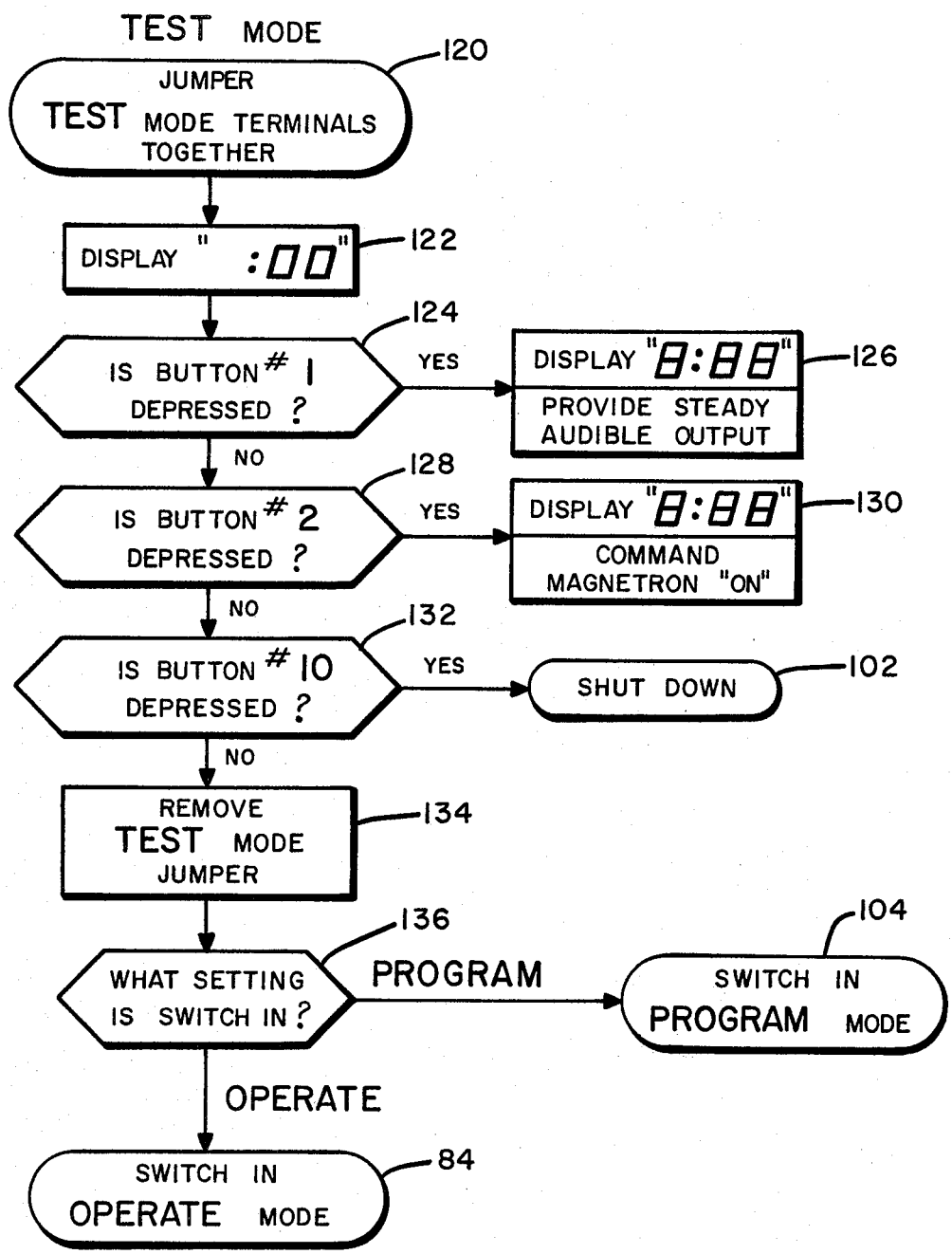
FIG. 5 is a flowchart for the TEST mode of the present invention.

Referring now more particularly to FIGS. 1 and 5, a TEST mode is described as follows. It is to be understood that the TEST mode about to be described is not intended to be available to oven operators or owners. Rather it is intended to be a service aid available only to trained service personnel and hence requires partial disassembly of the oven to obtain access to TEST mode terminals 38. The TEST mode of oven controller 24 is initiated 120 by jumpering or temporarily shorting TEST mode terminals 38 together. This causes 122 the display to indicate " :00". Various functions of controller 24 may now be selected by means of input buttons 16a-j. In the preferred embodiment, actuating 124 input button 16a causes the display to present "8:88" and provides 126 a steady audible output. Actuating 128 button 16b causes the display to present "8:88" and commands 130 magnetron "on" (by providing the OPERATE output signal 38). Actuating 132 input button 16j while in the TEST mode causes a shutdown 102. Once testing is complete, the TEST mode jumper is removed 134 and depending upon the setting of switch 22, the controller returns 136 to the OPERATE mode 84 or the PROGRAM mode 104.

SUMMARY

The previous description discloses a front programmable timer for a commercial microwave oven. In the OPERATE mode a person approaching the oven (operator) may select one from a plurality of operating times by using the input buttons. Such an operator is prevented from (and is most likely unaware of even the possibility of) changing any operating time. However, the oven owner or programmer has the ability to program a desired operating time for each input button using the same input buttons by switching to the PROGRAM mode. Hence an oven owner can quickly and easily tailor operating times to specific food types and quantities expected to be heated in that particular commercial setting. Furthermore, such programming is accomplished without the involvement of service personnel. Because of the speed and ease of programming, each operating time can te revised as often as desired by an oven owner. Finally, in the TEST mode, self-exercising features operable through the same front panel input buttons are available to trained service personnel to assist in diagnosis of oven malfunctions.

It is to be understood that the invention has been described with respect to a specific embodiment which provides the features and advantages previously described, and that such a specific embodiment is susceptible of modification as will be apparent to those skilled in the art. Accordingly the invention is not to be taken as limited to all of the details thereof as modifications and variations thereof may be made without departing from the spirit or scope of the invention.

What is claimed is:

1. A Method of programming a microwave oven controller comprising the steps of:
   A. actuating a tamper-proof switch to a first position such that a plurality of input switches are made effective to input desired operating times into said controller;
   B. actuating one of said input switches to identify it and inputting a desired operating time by actuating switches from among said plurality of input switches such that said controller receives, stores and thereafter associates said desired operating time with said one input switch; and
   C. actuating said tamper-proof switch to a second position such that subsequent actuation of said one input switch will recall its associated desired operating time and operate said controller for that time.

2. The method of claim 1 including operating a microwave oven controller by comprising the additional steps of:
   D. inserting an article in a microwave oven cavity; and
   E. actuating said one input switch causing microwaves to be applied to said article for the desired operating time associated with said one input switch.

3. The method of claim 1 wherein step B further comprises displaying a digit in response and in one-to-one correspondence to each actuation of said input switches.

4. The method of claim 3 wherein step C further comprises displaying a plurality of digits representative of the time remaining of said desired operating time upon actuation of said one input switch.

5. The method of claim 1 wherein step B further comprises storing said desired operating time in association with said one input switch such that said desired operating time and said association will be retained in the event of a subsequent loss of external electrical power to said controller.

6. A front programmable timer for a microwave oven having a cavity adapted to permit irradiation of articles placed therein by microwaves controlled by an electronic controller, the timer comprising:
   A. first and second selector means, said first selector means comprising a tamper-proof switch for selecting a PROGRAM mode or an OPERATE mode for said second selector means; and
   B. said second selector means comprising a plurality of input switches operable to
      i. input a plurality of desired operating times when in said PROGRAM mode such that each of said desired operating times is associated with a respective one of said input switches, and
      ii. operate said controller according to one of said desired operating times upon actuation of its associated input switch when in said OPERATE mode, such that said articles in said cavity are irradiated by microwaves for said desired operating time.

7. The timer of claim 6 further comprising display means for:
   i. displaying digits comprising said desired operating times when said PROGRAM mode is selected, and
   ii. displaying time remaining of said desired operating time when said OPERATE mode is selected and one input switch is actuated.

8. The timer of claim 6 further comprising storage means for storing said desired operating times subsequent to their input and in the event of loss of external electrical power to said controller.

9. The timer of claim 6 wherein said controller includes a set of preset times each in association with a respective one of said input switches such that said preset times are associated with their respective input switches upon initial application of external electrical power to said controller and wherein each of said preset times is available for selection in the OPERATE mode until said PROGRAM mode is selected and a different time is inputted.

10. The timer of claim 7 further comprising third selector means for selecting a TEST mode when actuated and for permitting said first selector means to determine said PROGRAM or OPERATE mode when said third selector neans is de-actuated; and
   wherein said third selector means is operable when actuated to:
      i. activate all portions of said display means and provide a steady audible output upon selective actuation of a first predetermined input switch,
      ii. activate all portions of said display means and provide a controller output signal commanding activation of said microwaves upon actuation of a second predetermined input switch, and
      iii. terminate said output signal upon actuation of a third predetermined input switch.

11. The timer of claim 6 wherein said second selector means further comprises a set of ten input switches, numbered respectively 1 through 10 and wherein actuation of switch number 10 is operative to input the digit 0 to said controller, and the remaining switches are operable to input each of their respective digits individually to said controller.

* * * * *